United States Patent
Mittal et al.

(10) Patent No.: US 12,087,043 B2
(45) Date of Patent: Sep. 10, 2024

(54) LEVERAGING UNSUPERVISED META-LEARNING TO BOOST FEW-SHOT ACTION RECOGNITION

(71) Applicant: Microsoft Technology Licensing, LLC, Redmond, WA (US)

(72) Inventors: Gaurav Mittal, Redmond, WA (US); Ye Yu, Redmond, WA (US); Mei Chen, Bellevue, WA (US); Jay Sanjay Patravali, Corvallis, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 17/535,517

(22) Filed: Nov. 24, 2021

(65) Prior Publication Data

US 2023/0113643 A1    Apr. 13, 2023

Related U.S. Application Data

(60) Provisional application No. 63/248,912, filed on Sep. 27, 2021.

(51) Int. Cl.
*G06K 9/00* (2022.01)
*G06F 16/73* (2019.01)
(Continued)

(52) U.S. Cl.
CPC .......... *G06V 10/7753* (2022.01); *G06F 16/73* (2019.01); *G06F 16/75* (2019.01);
(Continued)

(58) Field of Classification Search
CPC ............. G06V 10/7753; G06V 10/764; G06V 10/7747; G06F 16/73; G06F 16/75; G06N 20/00
See application file for complete search history.

(56) References Cited

U.S. PATENT DOCUMENTS

2017/0024899 A1\* 1/2017 Hammoud ........... G06V 10/758
2020/0366960 A1\* 11/2020 Quader ................ G06V 10/764
(Continued)

FOREIGN PATENT DOCUMENTS

WO    WO-2020190083 A1 \* 9/2020 ............. G06F 16/70

OTHER PUBLICATIONS

Unsupervised Deep Learning of Mid-Level Video Representation for Action Recognition, Jingyi Hou et al., AAAI, 2018, pp. 6910-6917 (Year: 2018).\*

(Continued)

*Primary Examiner* — Jayesh A Patel
(74) *Attorney, Agent, or Firm* — Foley IP Law, PLLC

(57) ABSTRACT

The disclosure herein describes preparing and using a cross-attention model for action recognition using pre-trained encoders and novel class fine-tuning. Training video data is transformed into augmented training video segments, which are used to train an appearance encoder and an action encoder. The appearance encoder is trained to encode video segments based on spatial semantics and the action encoder is trained to encode video segments based on spatio-temporal semantics. A set of hard-mined training episodes are generated using the trained encoders. The cross-attention module is then trained for action-appearance aligned classification using the hard-mined training episodes. Then, support video segments are obtained, wherein each support video segment is associated with video classes. The cross-attention module is fine-tuned using the obtained support video segments and the associated video classes. A query video segment is obtained and classified as a video class using the fine-tuned cross-attention module.

20 Claims, 7 Drawing Sheets

(51) Int. Cl.
G06F 16/75 (2019.01)
G06N 20/00 (2019.01)
G06V 10/764 (2022.01)
G06V 10/774 (2022.01)

(52) U.S. Cl.
CPC ........... *G06N 20/00* (2019.01); *G06V 10/764* (2022.01); *G06V 10/7747* (2022.01)

(56) References Cited

U.S. PATENT DOCUMENTS

| | | | | |
|---|---|---|---|---|
| 2021/0064883 | A1* | 3/2021 | Sharma | G06V 20/41 |
| 2022/0156593 | A1* | 5/2022 | Liu | G06N 3/084 |
| 2022/0303560 | A1* | 9/2022 | Sridhar | G06N 3/082 |
| 2022/0374629 | A1* | 11/2022 | Wu | G06V 10/82 |

OTHER PUBLICATIONS

Few-Shot Learning of Video Action Recognition Only Based on Video Contents, Yang Bo et al., CVF, 2020, pp. 595-604 (Year: 2020).*
Cross Attention Network for Few-shot Classification, Ruibing Hou et al., arXiv, 2019, pp. 1-12 (Year: 2019).*
Ops! Predicting Unintentional Action in Video, Dave Epstein et al., CVF, 2020, pp. 919-929 (Year: 2020).*
TARN: Temporal Attentive Relation Network for Few-Shot and Zero-Shot Action Recognition, Mina Bishay et al., arXiv, 2019, pp. 1-14 (Year: 2019).*
Rethinking Class Relations: Absolute-relative Supervised and Unsupervised Few-shot Learning, Hongguang Zhang et al., CVF, 2021, pp. 9432-9441 (Year: 2021).*
Learning Deep Spatio-Temporal Dependence for Semantic Video Segmentation, Zhaofan Qiu et al., IEEE, 2018, pp. 939-949 (Year: 2018).*
Evolving Losses for unsupervised video representation learning, AJ Piergiovanni et al., IEEE, 2020, pp. 130-139 (Year: 2020).*
Learning Temporal Co-Attention Models for Unsupervised Video Action Localization, Guoqiang Gong et al., CVF, 2020, pp. 9819-9828 (Year: 2020).*
Unsupervised Learning of View-invariant Action Representations, Junnan Li et al., NeurIPS, 2018, pp. 1-11 (Year: 2018).*
Few-shot Action Recognition with Prototype-centered Attentive Learning, Xiatian Zhu et al., arXiv, Mar. 28, 2021, pp. 1-10 (Year: 2021).*
Zhu, et al., "Compound Memory Networks for Few-Shot Video Classification", In Proceedings of the European Conference on Computer Vision, Jan. 2018, 16 Pages.
Santoro, et al., "Meta-Learning with Memory-Augmented Neural Networks", In Proceedings of the 33rd International Conference on Machine Learning, vol. 48, Jun. 19, 2016, pp. 1842-1850.
Snell, et al., "Prototypical Networks for Few-shot Learning", In Proceedings of Annual Conference on Neural Information Processing Systems, Dec. 4, 2017, 11 Pages.
Soomro, et al., "UCF101: A Dataset of 101 Human Actions Classes From Videos in The Wild", https://arxiv.org/pdf/1212.0402.pdf, Dec. 3, 2012, 7 Pages.
Sung, et al., "Learning to Compare: Relation Network for Few-Shot Learning", In Proceedings of IEEE/CVF Conference on Computer Vision and Pattern Recognition, Jun. 18, 2018, pp. 1199-1208.
Tao, et al., "Rethinking Motion Representation: Residual Frames with 3D ConvNets for Better Action Recognition", https://arxiv.org/pdf/2001.05661.pdf, Jan. 16, 2020, 10 Pages.
Tao, et al., "Self-supervised Video Representation Learning Using Inter-Intra Contrastive Framework", In Proceedings of the 28th ACM International Conference on Multimedia, Oct. 12, 2020, pp. 2193-2201.
Tian, et al., "Contrastive Multiview Coding", https://arxiv.org/pdf/1906.05849v1.pdf, Jun. 13, 2019, 15 Pages.

Tran, et al., "A Closer Look at Spatiotemporal Convolutions for Action Recognition", In Proceedings of IEEE/CVF Conference on Computer Vision and Pattern Recognition, Jun. 18, 2018, pp. 6450-6459.
Tran, et al., "Learning Spatiotemporal Features with 3D Convolutional Networks", In Proceedings of the IEEE International Conference on Computer Vision, Dec. 7, 2015, pp. 4489-4497.
Triantafillou, et al., "Meta-Dataset: A Dataset of Datasets for Learning to Learn from Few Examples", In International Conference on Learning Representations, Mar. 7, 2019, 14 Pages.
Vaswani, et al., "Attention Is All You Need", In Proceedings of Advances in Neural Information Processing Systems, Jun. 12, 2017, 11 Pages.
Vinyals, et al., "Matching Networks for One Shot Learning", In Proceedings of Annual Conference on Neural Information Processing Systems, Dec. 5, 2016, 9 Pages.
Wang, et al., "Low-Shot Learning from Imaginary Data", In Proceedings of the IEEE Conference on Computer Vision and Pattern Recognition, Jun. 18, 2018, pp. 7278-7286.
Wang, et al., "Non-local Neural Networks", In Proceedings of the IEEE Conference on Computer Vision and Pattern Recognition, Jun. 18, 2018, pp. 7794-7803.
Wang, et al., "Self-Supervised Spatio-Temporal Representation Learning for Videos by Predicting Motion and Appearance Statistics", In Proceedings of IEEE/CVF Conference on Computer Vision and Pattern Recognition, Jun. 15, 2019, pp. 4001-4010.
Wang, et al., "Self-Supervised Video Representation Learning by Pace Prediction", https://arxiv.org/pdf/2008.05861v1.pdf, Aug. 13, 2020, 22 Pages.
Wang, et al., "SimpleShot: Revisiting Nearest-Neighbor Classification for Few-Shot Learning", https://arxiv.org/pdf/1911.04623v1.pdf, Nov. 12, 2019, 6 Pages.
Wang, et al., "Temporal Segment Networks: Towards Good Practices for Deep Action Recognition", In European Conference on Computer Vision, Oct. 11, 2016, pp. 20-36.
Wu, et al., "A Multigrid Method for Efficiently Training Video Models", In Proceedings of IEEE/CVF Conference on Computer Vision and Pattern Recognition, Jun. 13, 2020, pp. 150-159.
Xian, et al., "Generalized Many-Way Few-Shot Video Classification", https://arxiv.org/pdf/2007.04755.pdf, Jul. 9, 2020, 17 Pages.
Xie, et al., "Rethinking Spatiotemporal Feature Learning: Speed-Accuracy Trade-offs in Video Classification", In Proceedings of the European Conference on Computer Vision, Jan. 2018, 17 Pages.
Xu, et al., "Self-Supervised Spatiotemporal Learning via Video Clip Order Prediction", In Proceedings of IEEE/CVF Conference on Computer Vision and Pattern Recognition, Jun. 15, 2019, pp. 10326-10335.
Zhang, et al., "Colorful Image Colorization", In European Conference on Computer Vision, Oct. 8, 2016, pp. 649-666.
Zhang, et al., "Few-Shot Action Recognition with Permutation-Invariant Attention", In Proceedings of European Conference on Computer Vision, Aug. 4, 2020, 19 Pages.
Lin, et al., "Self-Supervised Video Representation Learning with Meta-Contrastive Network", In repository of arxiv code: arXiv:2108.08426v2 [cs.CV], Aug. 23, 2021, 11 Pages.
"International Search Report and Written Opinion Issued in PCT Application No. PCT/US22/037959", Mailed Date: Oct. 12, 2022, 14 Pages.
Ye, et al., "Revisiting Unsupervised Meta-Learning: Amplifying or Compensating for the Characteristics of Few-Shot Tasks", In repository of arxiv code: 2011.14663v1 [cs.CV], Nov. 30, 2020, 19 Pages.
Zhu, et al., "Few-shot Action Recognition with Prototype-centered Attentive Learning", In repository of arxiv code: 2101.08085v4 [cs.CV], Mar. 28, 2021, 10 Pages.
Zhang, et al., "Few-shot Action Recognition via Improved Attention with Self-supervision", In repository of arxiv code: 2001.03905v1 [cs.CV], Jan. 12, 2020, 11 Pages.
Antoniou, et al., "How to Train Your Maml", https://arxiv.org/pdf/1810.09502v3.pdf, Mar. 5, 2019, 11 Pages.
Benaim, et al., "Speednet: Learning the Speediness in Videos", In Proceedings of the IEEE/CVF Conference on Computer Vision and Pattern Recognition, Apr. 13, 2020, pp. 9922-9931.

(56) References Cited

OTHER PUBLICATIONS

Bishay, et al., "Tarn: Temporal Attentive Relation Network for Fewshot and Zero-Shot Action Recognition", https://arxiv.org/pdf/1907.09021.pdf, Jul. 21, 2019, 14 Pages.
Cao, et al., "Few-shot Action Recognition with Implicit Temporal Alignment and Pair similarity Optimization", https://arxiv.org/pdf/2010.06215.pdf, Oct. 13, 2020, 12 Pages.
Cao, et al., "Few-Shot Video Classification via Temporal Alignment", In Proceedings of the IEEE/CVF Conference on Computer Vision and Pattern Recognition, Jun. 13, 2020, pp. 10618-10627.
Carreira, et al., "A Short Note on the Kinetics-700 Human Action Dataset", https://arxiv.org/pdf/1907.06987.pdf, Jul. 15, 2019, 6 Pages.
Carreira, et al., "Quo Vadis, Action Recognition? A New Model and the Kinetics Dataset", In Proceedings of Conference on Computer Vision and Pattern Recognition, May 22, 2017, pp. 6299-6308.
Chen, et al., "A Closer Look at Few-shot Classification", In Proceedings of International Conference on Learning Representations, Sep. 28, 2018, 16 Pages.
Chen, et al., "A Simple Framework for Contrastive Learning of Visual Representations", https://arxiv.org/pdf/2002.05709.pdf, Jul. 1, 2020, 20 Pages.
Doersch, et al., "CrossTransformers: Spatially-Aware Few-Shot Transfer", https://arxiv.org/pdf/2007.11498.pdf, Feb. 17, 2021, 24 Pages.
Doersch et al., "Unsupervised Visual Representation Learning by Context Prediction", In Proceedings of the IEEE International Conference on Computer Vision, Dec. 7, 2015, pp. 1422-1430.
Ren, et al., "Meta-Learning for Semi-Supervised Few-Shot Classification", https://arxiv.org/pdf/1803.00676.pdf, Mar. 2, 2018, 15 Pages.
Dwivedi, et al., "ProtoGAN: Towards Few Shot Learning for Action Recognition", In Proceedings of International Conference on Computer Vision Workshop, Oct. 27, 2019, pp. 1308-1316.
Feichtenhofer, et al., "Slowfast Networks for Video Recognition", In Proceedings of the IEEE International Conference on Computer Vision, Oct. 27, 2019, pp. 6201-6210.
Finn, et al., "Model-Agnostic Meta-Learning for Fast Adaptation of Deep Networks", In Proceedings of the 34th International Conference on Machine Learning, vol. 70, Jul. 18, 2017, 10 Pages.
Fu, et al., "Depth Guided Adaptive Meta-Fusion Network for Few-shot Video Recognition", In Proceedings of the 28th ACM International Conference on Multimedia, Oct. 12, 2020, pp. 1142-1151.
Gidaris, et al., "Boosting Few-Shot Visual Learning with Self-Supervision", In Proceedings of IEEE/CVF International Conference on Computer Vision, Oct. 27, 2019, pp. 8058-8067.
Gidaris, et al., "Dynamic Few-Shot Visual Learning Without Forgetting", In Proceedings of IEEE/CVF Conference on Computer Vision and Pattern Recognition, Jun. 18, 2018, pp. 4367-4375.
Gidaris, et al., "Unsupervised Representation Learning by Predicting Image Rotations", https://arxiv.org/pdf/1803.07728.pdf, Mar. 21, 2018, 16 Pages.
Girdhar, et al., "ActionVLAD: Learning Spatio-Temporal Aggregation for Action Classification", In Proceedings of EEE Conference on Computer Vision and Pattern Recognition, Jul. 21, 2017, pp. 3165-3174.
Goodfellow, et al., "Generative Adversarial Nets", In Proceedings of Advances in Neural Information Processing Systems, Jun. 10, 2014, 9 Pages.
Goyal, et al., "Accurate, Large Minibatch SGD: Training ImageNet in 1 Hour", https://arxiv.org/pdf/1706.02677v1.pdf, Jun. 8, 2017, 12 Pages.
Han, et al., "Memory-augmented Dense Predictive Coding for Video Representation Learning", https://arxiv.org/pdf/2008.01065.pdf, Aug. 3, 2020, 23 Pages.
Han, et al., "Self-Supervised Co-training for Video Representation Learning", In Proceedings of 34th Conference on Neural Information Processing Systems, Oct. 19, 2020, 12 Pages.

Hara, et al., "Can Spatiotemporal 3D CNNs Retrace the History of 2D CNNs and ImageNet?", In Proceedings of EEE/CVF Conference on Computer Vision and Pattern Recognition, Jun. 18, 2018, pp. 6546-6555.
Hariharan, et al., "Low-Shot Visual Recognition by Shrinking and Hallucinating Features", In Proceedings of IEEE International Conference on Computer Vision, Oct. 22, 2017, pp. 3037-3046.
He, et al., "Bag of Tricks for Image Classification with Convolutional Neural Networks", In Proceedings of IEEE/CVF Conference on Computer Vision and Pattern Recognition, Jun. 15, 2019, pp. 558-567.
He, et al., "Deep Residual Learning for Image Recognition", In Proceedings of the IEEE Conference on Computer Vision and Pattern Recognition, Jun. 27, 2016, pp. 770-778.
He, et al., "Momentum Contrast for Unsupervised Visual Representation Learning", In Proceedings of IEEE/CVF Conference on Computer Vision and Pattern Recognition, Jun. 13, 2020, pp. 9726-9735.
Hou, et al., "Cross Attention Network for Few-shot Classification", https://arxiv.org/pdf/1910.07677.pdf, Oct. 17, 2019, 12 Pages.
Hsu, et al., "Unsupervised Learning via Meta-Learning", In Proceedings of International Conference on Learning Representations, Oct. 4, 2018, 24 Pages.
Zhou, et al., "Temporal Relational Reasoning in Videos", In Proceedings of the European Conference on Computer Vision, Jan. 2018, 16 Pages.
Jing, et al., "Self-Supervised Spatiotemporal Feature Learning via Video Rotation Prediction", https://arxiv.org/pdf/1811.11387.pdf, Apr. 4, 2019, 12 Pages.
Khodadadeh, et al., "Unsupervised Meta-Learning for Few-Shot Image Classification", In Proceedings of 33rd Conference on Neural Information Processing Systems, Nov. 7, 2019, pp. 10132-10142.
Kim, et al., "Selfsupervised Video Representation Learning with Space-Time Cubic Puzzles", In Proceedings of the Thirty-Third AAAI Conference on Artificial Intelligence, Jan. 2019, pp. 8545-8552.
Koch, et al., "Siamese Neural Networks for one-Shot Image Recognition", In Proceedings of the 32nd International Conference on Machine Learning, vol. 2, Jul. 10, 2015, 8 Pages.
Kuehne, et al., "HMDB: A Large Video Database for Human Motion Recognition", In Proceedings of International Conference on Computer Vision, Nov. 6, 2011, pp. 2556-2563.
Lee, et al., "Unsupervised Representation Learning by Sorting Sequences", In Proceedings of IEEE International Conference on Computer Vision, Oct. 22, 2017, pp. 667-676.
Linsker, et al., "Self-Organization in a Perceptual Network", In Journal of Computer, vol. 21, Issue 3, Mar. 1988, pp. 105-117.
Lotter, et al., "Deep Predictive Coding Networks for Video Prediction and Unsupervised Learning", https://arxiv.org/pdf/1605.08104v1.pdf, May 25, 2016, 11 Pages.
Medina, et al., "Self-Supervised Prototypical Transfer Learning for Few-Shot Classification", https://arxiv.org/pdf/2006.11325.pdf, Jun. 19, 2020, 17 Pages.
Misra, et al., "Shuffle and Learn: Unsupervised Learning Using Temporal Order Verification", In European Conference on Computer Vision, Mar. 28, 2016, pp. 527-544.
Noorozi, et al., "Unsupervised Learning of Visual Representations by Solving Jigsaw Puzzles", In European Conference on Computer Vision, Mar. 30, 2016, pp. 69-84.
Oord, et al., "Representation Learning with Contrastive Predictive Coding", https://arxiv.org/pdf/1807.03748v1.pdf, Jul. 10, 2018, pp. 1-13.
Patravali, et al., "Unsupervised Few-Shot Action Recognition via Action-Appearance Aligned Meta-Adaptation", https://arxiv.org/pdf/2109.15317.pdf, Sep. 30, 2021, 11 Pages.
Piergiovanni, et al., "Evolving Losses for Unsupervised Video Representation Learning", In Proceedings of IEEE/CVF Conference on Computer Vision and Pattern Recognition, Jun. 13, 2020, pp. 130-139.
Qian, et al., "Spatiotemporal Contrastive Video Representation Learning", https://arxiv.org/pdf/2008.03800v1.pdf, Aug. 9, 2020, 10 Pages.

(56) References Cited

OTHER PUBLICATIONS

Qiu, et al., "Learning Spatio-Temporal Representation with Pseudo-3D Residual Networks", In Proceedings of the IEEE International Conference on Computer Vision, Oct. 22, 2017, pp. 5534-5542.
Ravi, et al., "Optimization as a Model for Few-Shot Learning", https://openreview.net/pdf?id=rJY0-Kcll, Nov. 5, 2016, 11 Pages.
Qian, et al., "Spatiotemporal Contrastive Video Representation Learning", In Proceedings of IEEE/CVF Conference on Computer Vision and Pattern Recognition, Jun. 20, 2021, pp. 6960-6970.

* cited by examiner

LEVERAGING UNSUPERVISED META-LEARNING TO BOOST FEW-SHOT ACTION RECOGNITION

BACKGROUND

Deep neural networks have achieved superior performance on transfer-learning to a set of novel classes on a broad spectrum of tasks such as image classification, object detection, action recognition, or the like. However, this performance is dependent on the availability of large-scale, well-distributed, clean, and labeled training data to first train a strongly supervised model. Obtaining such training data is time-consuming, expensive, and often infeasible. In particular, annotating video data at scale with diverse individual actions is time-consuming, error-prone, and impractical.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for preparing a cross-attention model for action recognition using pre-trained encoders and novel class fine-tuning is described. Unlabeled training video data is transformed into augmented training video segments, which are used to train an appearance encoder and an action encoder. The appearance encoder is trained using unsupervised training to encode video segments based on spatial semantics and the action encoder is trained using unsupervised training to encode video segments based on spatio-temporal semantics. A set of hard-mined training episodes are generated using the trained appearance encoder and the trained action encoder. The cross-attention module is then trained for action-appearance aligned classification using the set of hard-mined training episodes. Then, a set of support video segments is obtained, wherein each support video segment is associated with a video class of a set of video classes. The cross-attention module is fine-tuned for action-appearance aligned classification using the obtained set of support video segments and the associated video classes. A query video segment is obtained and classified using the fine-tuned cross-attention module, wherein the obtained query video segment is classified as being of a video class of the set of video classes.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
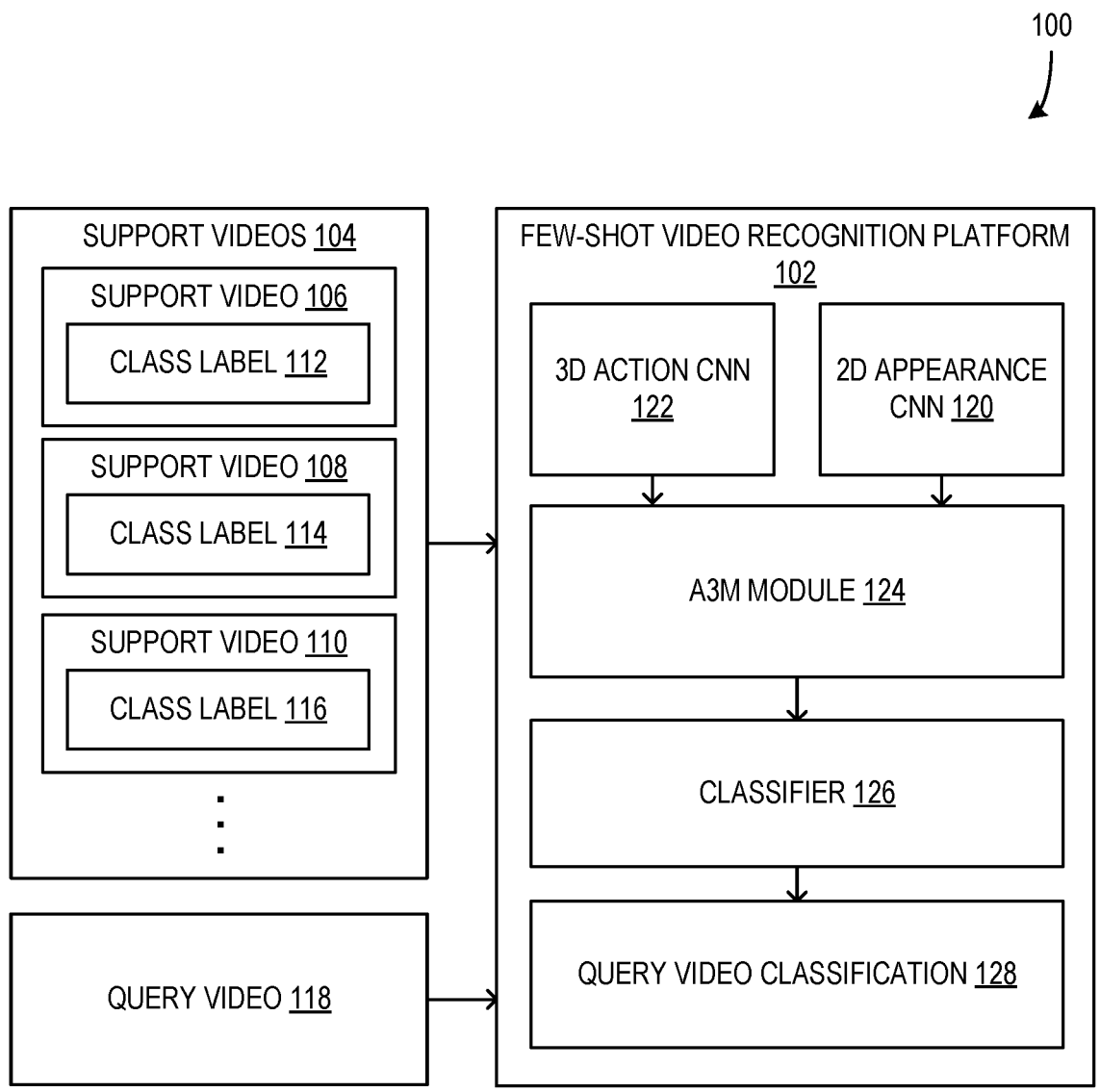
FIG. 1 is a block diagram illustrating a system configured to classify a query video based on few-shot training using support videos.

Aspects of the disclosure provide a computerized method and system for configuring and training a few-shot video recognition platform, for fine-tuning the platform to use novel video classes, and for classifying query videos based on the novel video classes. The disclosure includes training two CNNs or other encoders to capture both appearance-based and action-based features of each analyzed video segment. The two streams of embeddings/encodings are processed by a cross-attention module that is trained to classify the video based on both the appearance-based and action-based features. Because of the features of the disclosure, including the focus on classification of videos based on both types of features simultaneously, the described system can be fine-tuned to work with novel video classes using few-shot training episodes and once fine-tuned, the described system is configured to classify few-shot query videos accurately, efficiently.

The disclosure describes an unsupervised two-stream action-appearance network configured to learn fine-grained spatio-temporal 3D features over video segments via an action stream and spatial 2D features over video frames via an appearance stream. The disclosure operates in an unconventional manner at least by combining the two encoder streams to overcome the challenges associated with using each of the encoder streams individually. For instance, using only appearance with a 2D Convolutional Neural Network (CNN) (2D meaning only considering spatial cues in a single frame) lacks long-term temporal reasoning and incorrectly classifies some motion-heavy video (e.g., a video of a person jumping rope) as it relies on only frame-level spatial cues. Similarly, using only action with a 3D CNN (3D meaning detecting motions across multiple frames with 'time' as the third dimension) tends to overfit due to large parameter count and incorrectly classifies some video (e.g., a video of a golf swing) as it matches based on just the swinging action without paying attention to the spatial cues.

Further, the disclosed system is trained in an unsupervised manner such that it does not require labeled training data. Many AI services customers do not have access to a large amount of labeled data for training an accurate vision model. The disclosure overcomes this issue by using unlabeled video training data which many customers obtain (e.g., there is virtually infinite unlabeled video data available through the rise of multi-media social networking). The disclosure develops models for video action recognition that perform competitively on few-shot benchmarks without the use of either base-class labels or any external supervision.

Additionally, the disclosed few-shot video recognition platform, the Unsupervised Meta-learning system for Video Few-Shot Action Recognition (MetaUVFS) is configured to be fine-tuned using few-shot learning techniques via the Action-Appearance Aligned Meta-adaptation (A3M) module as described herein to enable identification and/or classification of video classes, including novel video classes for which the models of the disclosure were not initially trained. This enables the disclosed systems to be fine-tuned to operate with specific customers' video data and to identify custom video classes for those customers. Few-shot learning is used to fine-tune or otherwise train the model of the disclosure to transfer-learn or adapt quickly on novel, often out-of-domain, classes using as few labeled samples as possible to mitigate the lack of large-scale supervision for these novel classes. Few-shot learning is highly relevant for videos because collecting large-scale labeled video data is challenging with the additional temporal dimension.

FIG. 1 is a block diagram illustrating a system 100 configured to classify a query video 118 based on few-shot training using support videos 104. The system 100 includes a few-shot video recognition platform 102 that receives the set of support videos 104. The platform 102 meta-trains, fine-tunes, and/or adjusts an Action-Appearance Aligned Meta-adaptation (A3M) module 124 and/or a classifier 126 based on the support videos 104 and, upon receiving a query video 118, the platform 102 processes the query video 118 using a 2D appearance convolutional neural network (CNN) 120, a 3D action CNN 122, the adjusted A3M module 124, and the classifier 126 to generate a query video classification 128.

Further, the platform 102 is configured to be fine-tuned to classify certain classes of video segments based on relatively few frames for each support video. This "few-shot" fine-tuning process enables the platform 102 to be used for accurate video recognition and classification of novel classes of video segments based on a relatively fast training process that has small training data set requirements.

Figure 7:
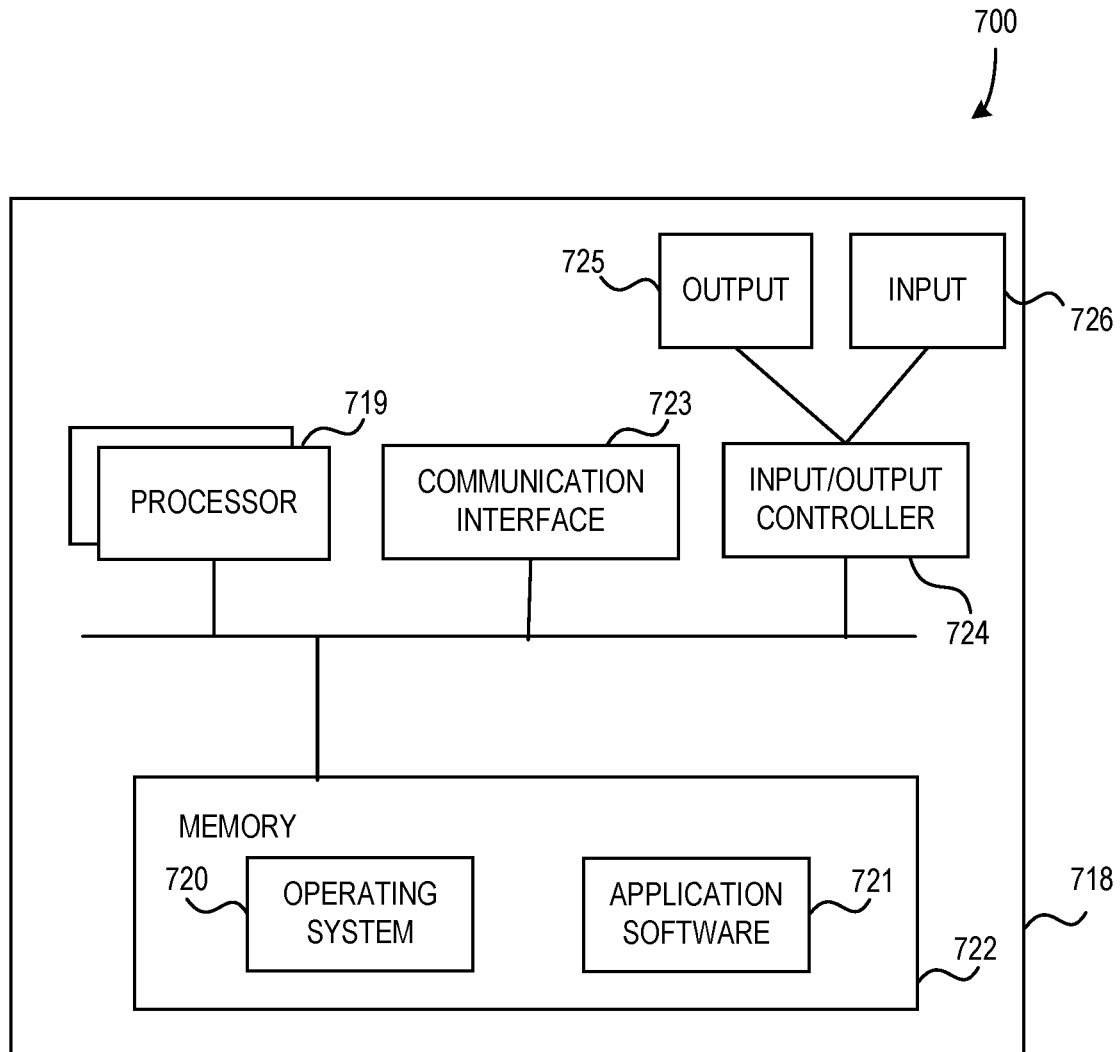
FIG. 7 illustrates an example computing apparatus as a functional block diagram.

In some examples, the few-shot recognition platform 102 is located on and/or executed on a computing device (e.g., a device such as the device described in FIG. 7). Additionally, or alternatively, the platform 102 is located on and/or executed on set of multiple computing devices that are in communication using network connections (e.g., on an intranet, on the Internet, or on other types or combinations of networks). For instance, in an example, the few-shot video recognition platform 102 is installed on a set of distributed computing devices (e.g., in the cloud) and the platform 102 is configured to include an interface enabling users to provide query videos 118 as input and/or receive query video classifications 128 as output. Further, in some examples, the platform 102 is configured to include an interface enabling a user to provide support videos 104 and fine tune or otherwise adjust the operation of the platform 102 as described herein.

Further, in some examples, some or all the components of the few-shot recognition platform 102 are located and/or executed on one or more computing devices on premises at a customer location (e.g., Internet of Things (IoT) devices and/or edge devices at the customer location that are configured to connect to a larger network of devices). In some such examples, the platform 102 and associated functionality is provided to the customer by a provider. For instance, in an example, the few-shot recognition platform 102 is deployed in a retail store where one or more surveillance cameras capture video feeds for long durations. The raw; unlabeled video feeds are utilized to train the platform 102 in an unsupervised manner as described herein (e.g., training the CNNs 122 and/or 120). Then, when the retail store needs a model to be deployed in the on-premises IoT devices to detect, for instance, novel activities of people in the store, a small quantity of video data can be annotated and provided to the trained platform 102 for few-shot fine tuning, as described herein.

In some examples, the platform 102 explicitly trains the A3M module 124 as a few-shot meta-learner via episodic training to improve performance on the downstream few-shot tasks having novel classes. The platform 102 first generates episodes at video instance level using noise-contrastive embeddings without any supervision and imposes a hardness threshold to boost few-shot meta-learning. Those generated episodes are then used to train the A3M module 124 and classifier 126 to classify query videos 118 based on both appearance and action features of the videos as described herein.

The support videos 104 include support videos 106, 108, and 110 and each of the support videos includes a class label (e.g., class labels 112, 114, and 116 of videos 106, 108, and 110 respectively). Each support video 104 is a video segment including a quantity of video frames. In some examples, the quantity of video frames in each support video 104 is roughly similar, but in other examples, the quantity of video frames in each support video 104 varies significantly. Further, in some examples, the set of support videos 104 includes more, fewer, or different support videos than as illustrated without departing from the description.

The class label of a support video 104 identifies the classification of that support video 104 and is used during the meta-training of the A3M module 124 and/or the classifier 126. Based on the class labels of the support videos 104, the operation of the platform 102 is adjusted such that it can accurately classify query videos 118 as being a part of a class of one or more of the class labels. For instance, if the support videos 104 includes videos of golf swings, tennis swings, and jumping rope with matching class labels (e.g., a class labels of "golf swing", "tennis swing", and "jumping rope"), the A3M module 124 and/or classifier 126 are meta-trained to identify and classify query videos 118 using the class labels of "golf swing", "tennis swing", and "jumping rope".

In some examples, the A3M module 124 and/or classifier 126 are initially trained using hard-mined video segments. This initial training process is described in greater detail below with respect to FIGS. 3 and 4.

Further, in some examples, the CNNs 120 and 122 are trained using large-scale unlabeled video data (e.g., more than 500,000 video segments as training data). The CNNs 120 and 122 form a two-stream action appearance network that is trained to identify fine-grained spatio-temporal 3D features (e.g., motion of objects in video segments) over video segments using the 3D action CNN 122 and to identify spatial 2D features (e.g., shapes of visible objects) in video frames via the 2D appearance CNN 120. The training of the CNNs 120 and 122 is described in greater detail below with respect to FIG. 2.

Figure 2:
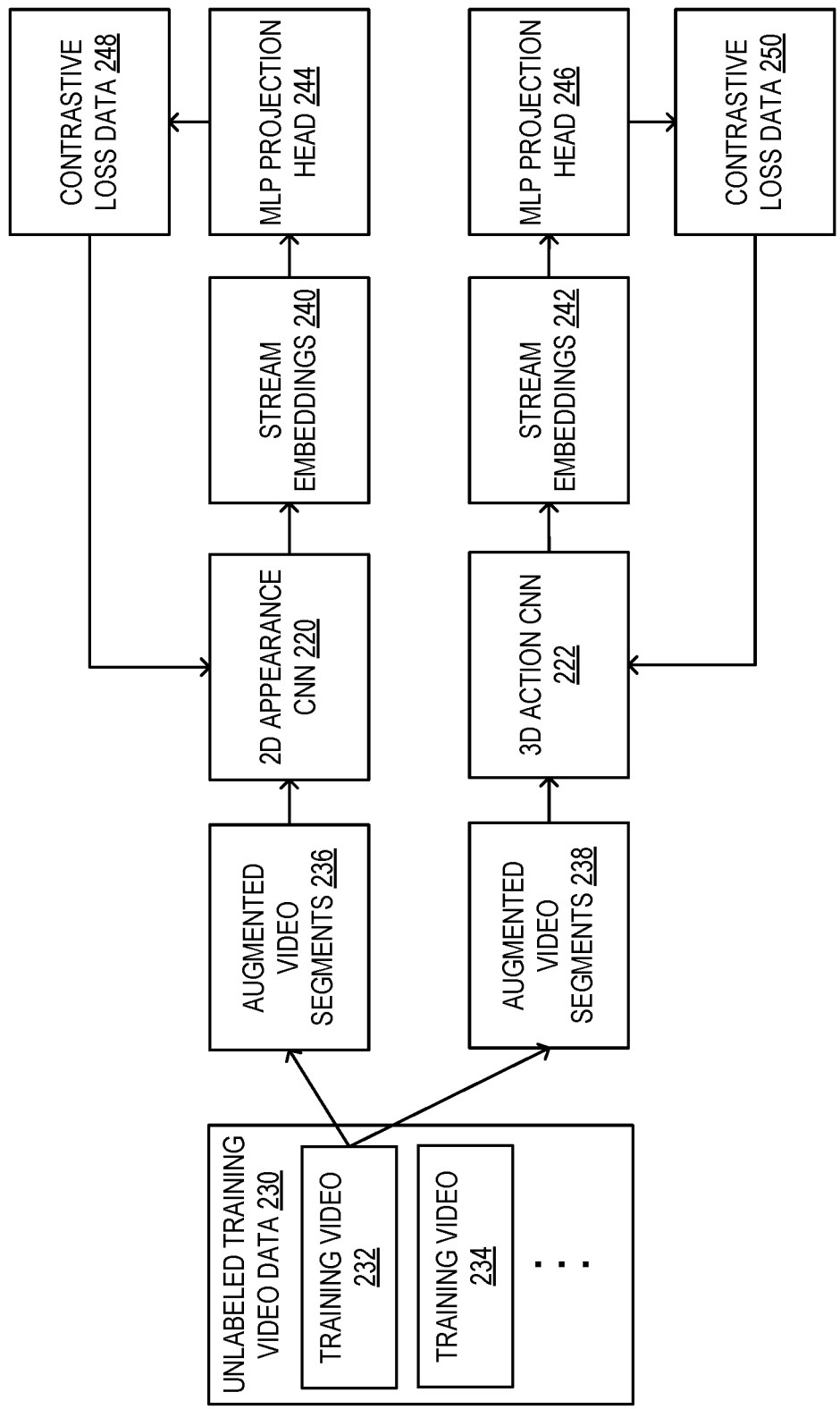
FIG. 2 is a block diagram illustrating a system configured to train a two-stream network including a 2D appearance CNN and a 3D action CNN using unlabeled training video data.

FIG. 2 is a block diagram illustrating a system 200 configured to train a two-stream network including a 2D appearance CNN 220 and a 3D action CNN 222 using unlabeled training video data 230. In some examples, the system 200 is part of or otherwise in communication with a system such as system 100 of FIG. 1. Further, in some examples, the 2D appearance CNN 120 and 3D action CNN 122 of system 100 are trained as described here with respect to 2D appearance CNN 220 and 3D action CNN 222.

The training of the CNNs 220 and 222 leverage large-scale quantities of unlabeled training video data 230 (e.g., more than 500,000 video segments) to learn video representations via contrastive learning (e.g., noise-contrastive estimation (NCE) such as InfoNCE).

The unlabeled training video data 230 includes a set of training videos (e.g., videos 232 and 234) that are not labeled or classified in any way. The system 200 is configured to use augmentations of segments of the training video data 230 to form augmented video segments 236 and 238. The CNNs 220 and 222 are then trained to correctly match each input training video sample (e.g., a training video 232) with an augmented version of itself (e.g., an augmented video segment 236) among a batch of other videos and their respective augmented versions.

Further, in some examples, semi-supervised (e.g., training using unlabeled training video data 230 and some labeled training video data in combination) is used to train the CNNs 220 and/or 222 for action recognition as described herein. In some examples using semi-supervised training, the training process as described has improved performance over using just unlabeled data and/or just labeled data (e.g., there is generally much less labeled data to use for training, so expanding the quantity of training data using large quantities of unlabeled data improves the resulting training process). For instance, in an example, unlabeled surveillance video data from a specific retail store in which the video recognition platform is used is combined with publicly available labeled video datasets to pretrain the model of the platform for few-shot fine tuning on downstream tasks, as described herein.

In some examples where semi-supervised training is used, a model is randomly initialized and/or pretrained on a labeled image and/or video dataset (e.g., ViT-Small+ImageNet-22k). Then, that model is meta-trained on a large, unlabeled set of video data that is conditioned on labeled video data via semi-supervision. In some examples of such meta-training, soft pseudo-labels are assigned to each spatio-temporal augmentation of a video as per nearest neighbor cosine similarity with labeled videos of the labeled video data. Additionally, or alternatively, the model is fine-tuned based on the labeled video data, but this is considered optional. After the model meta-training is complete, it is fine-tuned on few-shot labeled video data from novel classes as described herein.

Additionally, or alternatively, the training process of the system 200 uses weakly-supervised training for training the CNNs 220 and/or 222. In such examples, the training video data used includes video-level information (e.g., an indication that an action occurs at some point in the video) rather than frame-level information (e.g., indications that an action is occurring during specific frames of the video). Further, the fine-tuning stage described herein can be modified to incorporate multi-instance learning that allows a model trained with video-level labeled training data to be trained to make frame-level action prediction. For instance, in an example where training video data includes a video that is labeled to indicate that a long jump action occurs at some point in the video, the model is trained to predict or otherwise determine which frames of the video include the long jump action.

In some examples where weakly supervised training is used, a model is randomly initialized and/or pretrained on a labeled image and/or video dataset (e.g., ViT-Small+ImageNet-22k). Then, that model is meta-trained on a large, unlabeled set of video data that is conditioned on video-level labeled video data via semi-supervision and multi-instance learning. Additionally, or alternatively, the model is fine-tuned based on the video-level labeled video data using multi-instance learning, but this is considered optional. After the model meta-training is complete, the model is able to make frame-level classifications and/or predictions, as described herein.

In some examples, the generation of augmented video segments 236 and 238 from a training video 232 includes sampling frames from the training video 232 and applying one or more augmentations to those frames (e.g., a single augmented video segment includes the set of sampled frames that have been consistently augmented). For instance, in some examples, the sampled frames of an augmented video segment 236 for use with the 2D appearance CNN 220 includes eight input frames where one frame is randomly sampled from each of eight segments equally partitioned along the video length. Because the 2D appearance CNN 220 is trained to focus on spatial information, a resolution is chosen (224×224) that enables accurate identification of spatial features. This sampling protocol is referred to as '8×1'.

Additionally, or alternatively, in some examples, the sampled frames of an augmented video segment 238 for use with the 3D action CNN 222 includes a set of four sequential input frames from each of four segments equally partitioned along the video length, resulting in a 16-frame input segment. To balance the spatio-temporal information with that in the 8×1 sampling protocol, a lower frame resolution (e.g., 112×112) is used. This sampling protocol is referred to as '4×4'.

Further, in some examples, the augmentations applied to the sampled video segments include one or more randomly chosen spatial augmentations, such as random crops of sections of the video, horizontal flips, random color jitters or changes, random grayscale usage, Gaussian blur, or the like (e.g., the SimCLR spatial augmentation protocol). The spatial augmentation in each augmented video segment is consistent across all frames of that segment. For instance, a first augmented video segment 236 is generated from the training video 232 where grayscale is applied to each of the frames in the segment 236 and a second augmented video segment 236 is generated from the training video 232 where a horizontal flip is applied to each of the frames in the segment 236.

The CNNs 220 and 222 each process the augmented video segments 236 and 238 into stream embeddings 240 and 242 respectively, as illustrated. In some examples, the 2D appearance CNN 220 is associated with an appearance stream that captures the high-level spatial semantics of the video. The appearance stream $f^{ap}$ encodes a sequence of F frames, $X^{ap}=[x_t^{ap}]_{t=1}^{F}$, into embeddings 240, $h^{ap}=[h_t^{ap}]_{t=1}^{F}$, where $h_t^{ap}=f^{ap}(x_t^{ap})$. In such examples, $h^{ap}$ are averaged to obtain $h^{ap}$.

Further, the 3D action CNN 222 is associated with an action stream that captures spatio-temporal semantics, such as movement of objects, of the video. The action stream $f^{act}$ encodes a sequence of F' frames, $X^{act}=[x_t^{act}]_{t=1}^{F_1}$, into a single embedding 242, $h^{act}$, where $h_t^{act}=f^{act}(X^{act})$. Inductive biases of using 2D and 3D convolutional models in the appearance and action streams respectively enable the streams to specialize in capturing the appearance and action-related video information.

In some examples, the training objective of the illustrated two-stream network is based on the multi-view InfoNCE contrastive loss formulation of the Infomax principle. This formulation maximizes the mutual information between embeddings of multiple views of x, $x_i$, and $x_j$, where x is a training video 232 and x; and x are augmented video segments of x (e.g., augmented video segments 236 and/or 238). In contrastive learning, the network is trained to match each input sample with an augmented version of itself among a large training batch of other samples.

For instance, in some examples, the system 200 is configured to use Normalized Temperature-scaled Cross Entropy (NT-Xent) loss defined as, $$\mathcal{L}^{NT-Xent}(x_i, x_j) = -\log \frac{e^{sim(z_i, z_j)/\tau}}{\sum_{i=1}^{2N} \mathbb{1}_{[k \neq i]} e^{sim(z_i, z_k)/\tau}} \quad (1)$$

where $sim(z_i, z_k)$ is the cosine similarity between $z_i$ and $z_k$, $\tau$ is a temperature scalar and $z_k = g(x_k)$. N is the size of the mini-batch of distinct samples where each sample x has $x_i$ and $x_j$ as positive augmentations. As shown in equation 1 above, the NT-Xent loss maximizes the agreement between two augmented views $x_i$ and $x_j$ of the same input sample x in a low-dimension representation space encoded by g.

For action-based augmented video segment 236, $x_i^{act}$, and appearance-based augmented video segments 238, $x_{i1}^{ap}, \ldots, x_{iF}^{ap}$, the respective stream embeddings 240 and 242, $h_i^{act}$ and $h_i^{ap}$, are fed to multilayer perceptron (MLP) projection heads 244 and 246 to obtain normalized projection embeddings, $z_i^{act}$ and $z_i^{ap}$. In some examples, the MLP projection heads 244 and 246 are two-layer neural networks with a first layer that has a hidden size of 1024 and a second layer that has a hidden size of 128. The non-linear activation function used between the two layers is Rectified Linear Unit (ReLU). The output of the MLP heads is L2-normalized to obtain the normalized projection embeddings (the z values). Further, other normalized projection embeddings are obtained for other augmentation video segments associated with the same training video (e.g., $z_j^{act}$ and $z_j^{ap}$ for $x_j^{act}$ and $x_{j1}^{ap}, \ldots, x_{jF}^{ap}$). The z values $z_j^{ap}$ and $z_i^{ap}$ are used to compute $\mathcal{L}_{NCE}^{ap}$ contrastive loss (e.g., contrastive loss data 248) to train the 2D appearance CNN 220 and the z values $z_j^{act}$ and $z_i^{act}$ are used to compute $\mathcal{L}_{NCE}^{act}$ contrastive loss (e.g., contrastive loss data 250) to train the 3D action CNN 222. In some examples, the contrastive loss values are used to train the CNNs 220 and 222 by backpropagating the gradients computed for the CNN parameters with respect to the loss values.

Additionally, or alternatively, in some examples, the deep residual networks ResNet50) architecture is used to train the 2D appearance CNN 220 and ResNet50-3D is used to train the 3D action CNN 222. In such examples, the dimensions of $z^{ap}$ and $z^{act}$ obtained from the MLP projection heads is 128. The action and appearance CNNs 220 and 222 are first trained individually using loss data as described above. A batch size of 512 is used to train both models 220 and 222 for 300 epochs on 64 graphics processing units (GPUs). Then, a gradual learning rate (LR) warmup is used for 5 epochs followed by a half-period cosine learning rate decay with stochastic gradient descent (SGD) optimizer and 0.9 momentum. With 0.001 per-GPU LR, the process also linearly scales the LR to 0.064. In other examples, the training process is configured and/or performed in different ways without departing from the description.

While much of the description herein describes the use of two action recognition streams with one stream being appearance-based and the other stream being action-based (e.g., training the CNN 220 to recognize appearance and training the CNN 222 to recognize actions), in other examples other recognition modalities are used. Modalities used in systems and methods described herein include RGB-based appearance, optical flow/motion, depth data from time-of-flight sensors, audio data, data from Light Detection and Ranging (LiDAR) sensors, data from Radio Detection and Ranging (RADAR) sensors, text and/or language data, or the like. In settings with data from wearable/ mobile sensors such as accelerometers, gyroscopes, magnetometers, pressure sensor, etc., data modalities from such sensors can also be used for action recognition (e.g., fine-grained action recognition and/or coarse-grained action recognition).

Additionally, or alternatively, while much of the description describes the use of two action recognition streams, in other examples, more than two streams are used without departing from the description. In such examples, more or different methods of combining embeddings from the multiple streams (e.g., in A3M module 424 as described below) are used.

Figure 3:
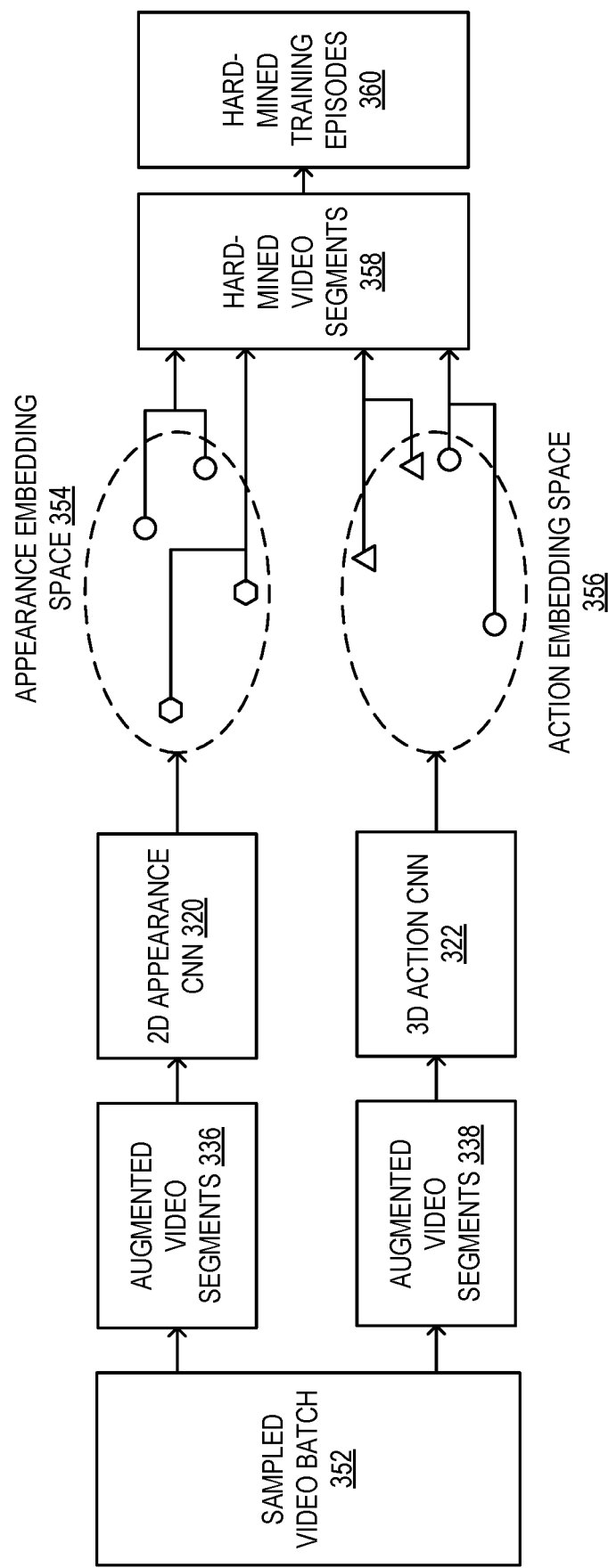
FIG. 3 is a block diagram illustrating a process of generating hard-mined training episodes using 2D appearance CNN and the 3D action CNN.

FIG. 3 is a block diagram illustrating a process 300 of generating hard-mined training episodes 360 using the 2D appearance CNN 320 and the 3D action CNN 322. In some examples, the process 300 is performed in a system such as system 100 of FIG. 1 and/or system 200 of FIG. 2 as described herein. Further, in some examples, the CNNs 320 and 322 of process 300 have been trained as described above with respect to system 200 of FIG. 2. The episode-based meta-training for which the few-shot video recognition platform 102 is configured is simulated using the hard-mined training episodes 360 generated during process 300.

In some examples, the process generates 1-shot, 5-way classification episodes (e.g., a training set of video segments with five classes having one support sample per class to fine-tune the model and one or more query samples per class to test the model) where the support video segments and query video segments for each class are formed using spatio-temporal augmentations (e.g., as described above with respect to augmenting the training video 232 into augmented video segments 236 and 238). These episodes can be generated from a large video batch 352 that is unlabeled. In this way, the classification happens at the instance level, with each video behaving as its own class, and the task is to classify a query video segment that is an augmented version of a matching video belonging to the associated video class.

In some examples, training episodes are generated randomly from the sampled video batch 352 and random augmentations thereof. However, in some cases, contrastive learning pushes the embeddings for augmentations of a video close to each other compared to embeddings for augmentations of other videos. Thus, randomly sampled videos tend to provide many training episodes that are trivially solvable such that they impede or reduce meaningful learning by the A3M module as described below with respect to FIG. 4. The illustrated process 300 uses hard-mining techniques to focus on videos and associated augmentations that provide training value.

The process 300 includes augmenting videos from a sampled video batch 352 to generate augmented video segments 336 and 338 for use with the CNNs 320 and 322. Each video of the sampled video batch 352 is augmented multiple times to form multiple augmented video segments such that the set of augmented video segments for a CNN includes multiple augmented video segments that map back to a single video of the sampled video batch 352. The CNNs 320 and 322 generate stream embeddings (e.g., stream embeddings 240) and 242 of FIG. 2) based on each of augmented video segments 236 and 238. Those generated stream embeddings are analyzed based on their relative locations in the appearance embedding space 354 and the action embedding space 356 respectively. Specifically, for stream embeddings that share a source video of the sampled video batch 352, the relative distance between those stream embeddings is determined (e.g., using cosine similarity or the like).

For each CNN 320 and 322, a set of hard-mined video segments 358 is selected, where some or all of the selected hard-mined video segments 358 have associated augmented video segment embeddings with highest relative distances, or least cosine similarity values, in the appearance embedding space 354 and/or the action embedding space 356. As illustrated, the embeddings of associated augmented video segments are shown as objects of the same shape in different locations in the embedding spaces 354 and 356. For instance, the selected set of hard-mined video segments 358 includes the set of 100 video segments associated with augmentations with the least cosine similarity values in the appearance embedding space 354 and the set of 100 video segments associated with augmentations with the least cosine similarity values in the action embedding space 356. In related examples, the segments associated with each embedding space are pooled together such that the resulting training episodes are configured to reduced confusion from both an action and an appearance perspective. In other examples, other quantities of hard-mined video segments are selected from the embedding spaces 354 and/or 356 without departing from the description.

Additionally, or alternatively, the hard-mined video segments 358 include a selection of randomly sampled videos. For instance, in an example, 10% of the selected hard-mined video segments 358 are randomly chosen videos to support exploration and to cover all video samples on expectation.

The set of hard-mined video segments 358 are used to generate a set of hard-mined training episodes 360. In some examples, the hard-mined video segments 358 are randomly sampled to generate the set of training episodes 360. Each hard-mined training episode consists of a subset of the hard-mined augmented video segments. In each episode, the hard-mined augmented video segments are split into two groups called support and query such that some of the augmentations associated with a non-augmented source video are put in the support group and the remaining augmentations associated with the same non-augmented source video are put in the query group. Each augmentation (both in support and query groups) is assigned an identifier that identifies the class (e.g., the non-augmented source video with which it is associated). The samples and their corresponding identifiers in the support group are used to meta-train the A3M module to learn to correctly predict the identifier for the samples in the query group. As a result, the use of the training episodes 360 mimics the fine-tuning and/or adaptation process of the A3M module as described herein.

Figure 4:
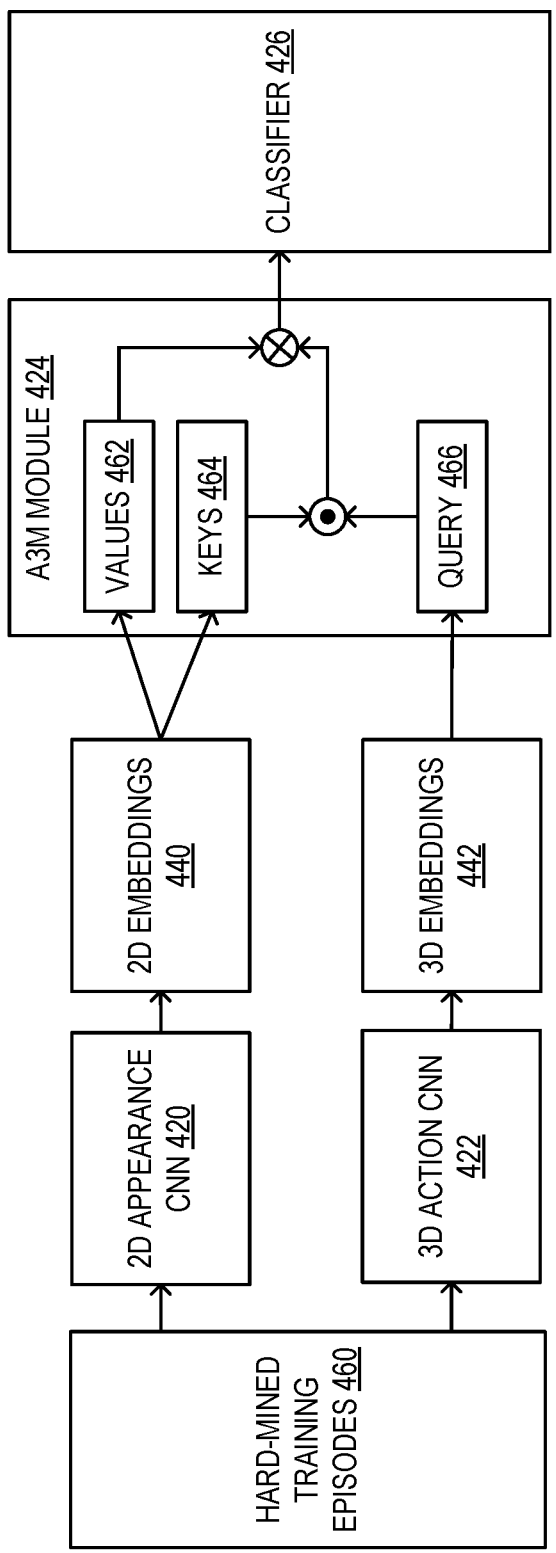
FIG. 4 is a block diagram illustrating a process of training an Action-Appearance Aligned Meta-adaptation (A3M) module and classifier using hard-mined training episodes.

FIG. 4 is a block diagram illustrating a process 400 of training an Action-Appearance Aligned Meta-adaptation (A3M) module 424 and classifier 426 using hard-mined training episodes 460. In some examples, the process 400 is performed in a system such as system 100 of FIG. 1 and/or system 200 of FIG. 2 as described herein. Further, in some examples, the hard-mined training episodes 460 are generated using a process such as process 300 of FIG. 3. The training of the A3M module 424 includes episodic meta-learning that mimics the episodic few-shot meta-training (e.g., the meta-training of the few-shot video recognition platform 102 using the support videos 104) during the training phase.

In some examples, the A3M module 424 includes an attention map 462 that is trained and/or conditioned on action and appearance features of videos to cause it to better focus on action-specific features in the frame-level appearance embeddings. This process improves the intra-class similarity and reduces the inter-class confusion for few-shot training of the A3M module 424.

The A3M module 424 is configured to attend to both action and appearance-related aspects of a video in correspondence to each other to enhance intra-class relationships and avoid inter-class confusion, particularly when learning from very few labeled samples. To this end, the A3M module 424 is configured as a novel cross-attention module that can be trained to meta-learn to cross-align action features with appearance features.

In some examples, the A3M module 424 is configured to establish a correspondence between the action and appearance features using attention-based transformers. Three linear mappings, values 462, keys 464, and queries 466, associated with the embeddings 440 and 442 are parameterized using such transformers: key-head K: $\mathbb{R}^D \to \mathbb{R}^{d_k}$, value-head V: $\mathbb{R}^D \to \mathbb{R}^{d_v}$ and query-head Q: $\mathbb{R}^D \to \mathbb{R}^{d_k}$, where $d_k$ and $d_v$ are the size of the key and value embeddings respectively. Key-value pairs are generated using K and V for the frame-level representations, $h_{i1}^{ap}, \ldots, h_{iF}^{ap}$, from the 2D appearance CNN 420. Let $k_m = K \cdot h_m^{ap}$ and $v_m = V \cdot h_m^{ap}$ form the key-value pair for the $m^{th}$ frame-level representation for unlabeled episode 460, $x_i$. Let a query embedding be generated, $q = Q \cdot h^{act}$, for the spatio-temporal feature, $h^{act}$, from the 3D action CNN 422 using Q. Then, the dot-product attention scores are calculated between the keys and the query, and those scores are normalized via SoftMax over all key embeddings as, $$a_m = \frac{\exp(k_m \cdot q / \sqrt{d_k})}{\sum_t \exp(k_t \cdot q / \sqrt{d_k})} \quad (2)$$

where $a_m$ is the attention score for the $m^{th}$ frame embedding. These attention scores provide a soft correspondence that align and relate the action information with the appearance information of the video. The attention scores are then combined with the value head embeddings and aggregated via sum to obtain a single feature embedding, $h^{A3M} = \Sigma_m a_m v_m$. As the attention scores are computing via a combination of action and appearance features, they weigh the appearance features to focus on the most action-relevant parts. The aggregated embedding $h^{A3M}$, conditioned on both action and appearance information, is therefore better equipped than naive concatenation for few-shot tasks. Further, the embedding obtained from the A3M module 424 is fed to the classifier layer 426 to make predictions. The 2D and 3D CNNs are frozen and the A3M module along with the classifier are meta-trained via a MAML algorithm or the like using the unsupervised hard-mined training episodes as described herein.

Returning to FIG. 1, after the components of the few-shot video recognition platform 102 are trained as described above with respect to FIGS. 2, 3, and 4, the platform 102 is configured to be fine-tuned to classify videos of novel classes. In some examples, this process includes a round of fine-tuning the A3M module 124 and classifier 126 using the support videos 104 associated with novel class labels (e.g., class labels 112, 114, and/or 116). Then, the platform 102 is tested using sample query videos 118 from the novel classes to confirm that the fine-tuned platform 102 can accurately perform classifications of the novel classes of videos.

In some examples, the fine-tuning of the A3M module 124 includes fine-tuning for fine-grained action recognition and/or for coarse-grained action recognition. In fine-grained action recognition, the set of action classes being tuned for are very similar (e.g., different moves in gymnastics or different kinds of snow boarding tricks). In coarse-grained action recognition, the set of action classes being tuned for are less similar (e.g., baseball bat swing actions vs golfclub swing actions). The described platform 102 is compatible with both types of action recognition fine-tuning and/or the combination of both types (e.g., some of the action classes are very similar to each other and other action classes are relatively different from each other).

In some examples, Model-Agnostic Meta Learning (MAML) is used to train the platform 102 to learn to adapt to a new task of novel action classes with few labeled samples. The two backbone CNNs 120 and 122 are frozen and the function $f_\theta$ of the platform, including the A3M module 124 and classifier 126, are trained as described herein using few-shot episodic meta-training. The action-appearance aligned feature embedding from the A3M module 124 is L2-normalized before being fed to the classifier 126. For each generated training episode (e.g., support video 104) e∈E in a training iteration, s support augmentations are generated for sampled videos and adapted parameters are computed with gradient descent of the cross-entropy classification loss $\mathcal{L}$ over $f_\theta$ as $\theta_e' = \theta - \alpha \nabla_\theta \mathcal{L}_e(f_\theta)$ where a is the adaptation learning rate. Then, q query augmentations are generated for videos in episode e to compute the loss $\mathcal{L}$ using adapted parameters $\theta_e'$ as $\mathcal{L}_e(f_{\theta_e'})$. This is repeated for all E episodes. Finally, θ is updated at the end of the training iteration as $\theta \leftarrow \theta - \beta \nabla_\theta \Sigma_e^E \mathcal{L}_e(f_{\theta_e'})$ where β is the learning rate for the meta-learner optimizer.

In such examples, once trained, the platform 102 is tested by fine-tuning on multiple few-shot test episodes (e.g., query videos 118). For each episode, the action-appearance CNNs 120 and 122 are frozen and the A3M module 124 and classifier 126 layers which have been meta-trained are further fine-tuned. After every episode, the parameters of A3M module 124 and classifier 126 layers are refreshed for the next episode.

Further, in some examples, the platform 102 is evaluated on datasets based on 5-way, 1-shot episodes and/or on 5-way, 5-shot episodes. For each episode, five classes are randomly sampled from the set of novel classes for classification and training happens on one and five support samples per class respectively. Fine-tuning is done at a constant learning rate of 10 for 50 epochs in all experiments. In other examples, other configurations or settings are used without departing from the description.

Figure 5:
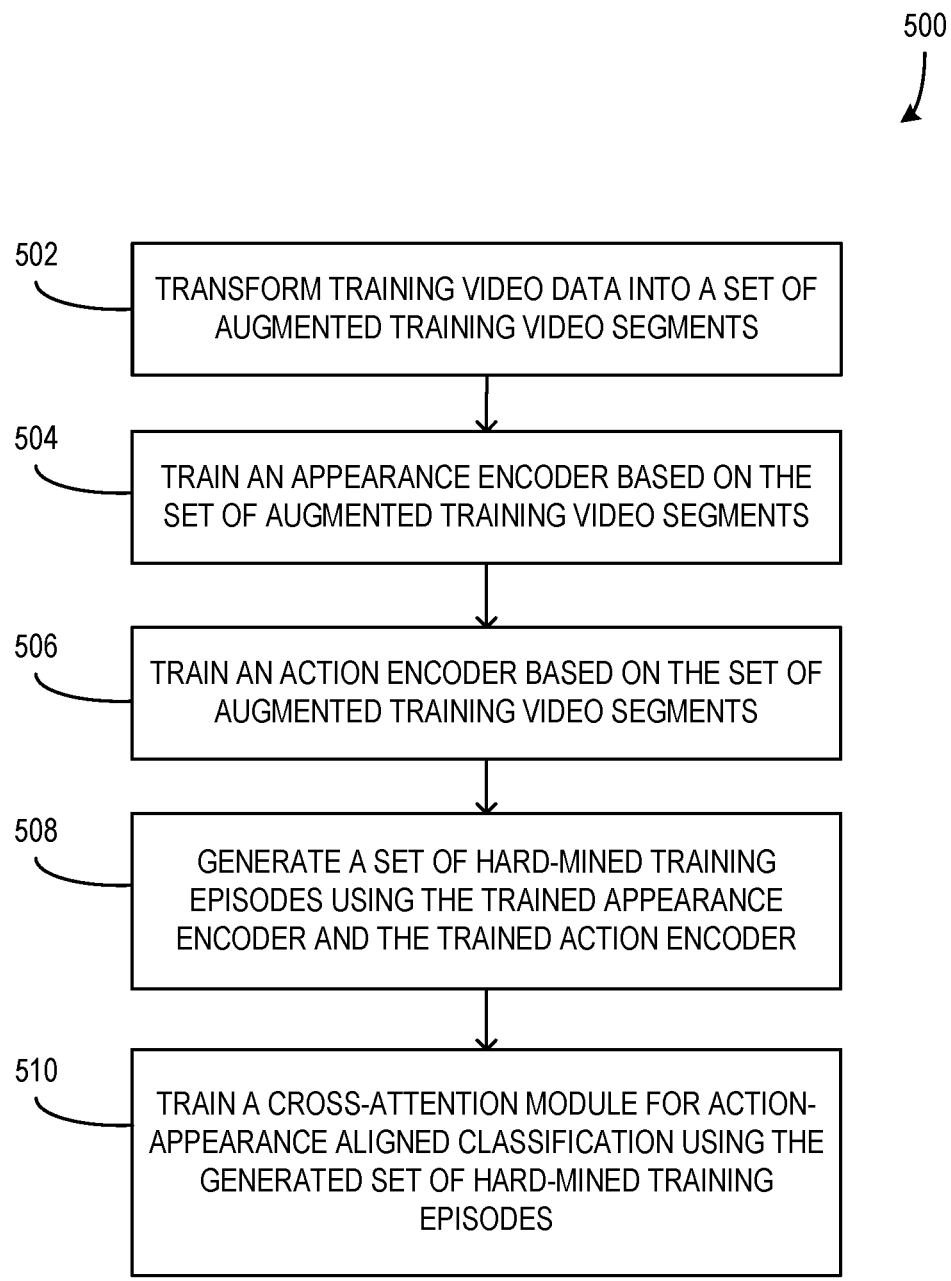
FIG. 5 is a flowchart illustrating a computerized method for training a few-shot video recognition platform.

FIG. 5 is a flowchart illustrating a computerized method 500 for training a few-shot video recognition platform (e.g., platform 102). In some examples, the computerized method 500 is executed or otherwise performed on a system such as system 100 of FIG. 1 as described herein. At 502, training video data is transformed into a set of augmented training video segments. In some examples, the training video data is a set of unlabeled video episodes, and those video episodes are augmented using random augmentations, such as random crops of sections of the video, horizontal flips, random color jitters or changes, random grayscale usage, Gaussian blur, or the like. Further, in some examples, each video episode is augmented in multiple ways to create multiple augmented video segments per video episode (e.g., a video episode is transformed into a first augmented video segment that has been randomly cropped and a second augmented video segment that has grayscale applied).

At 504, an appearance encoder (e.g., a 2D appearance CNN 120) is trained based on the set of augmented training video segments. In some examples, the augmented training video segments include sampled sets of video frames from each video episode that are evenly spaced throughout the video episode (e.g., an 8×1 sampling protocol as described above with respect to FIG. 2).

At 506, an action encoder (e.g., a 3D appearance CNN 122) is trained based on the set of augmented training video segments. In some examples, the augmented training video segments include sampled sets of video frames from each video episode that are in groups of consecutive frames spaced throughout the video episode (e.g., a 4×4 sampling protocol as described above with respect to FIG. 2).

At 508, a set of hard-mined training episodes (e.g., hard-mined training episodes 360) is generated using the trained appearance encoder and the trained action encoder. In some examples, generating the set of hard-mined training episodes includes generating embeddings of multiple augmented video segments for each training video episode using the appearance encoder and the action encoder and determining the similarity between the embeddings. Those determined similarities are used to determine the training video episodes with augmented video segment embeddings that have the least similarity with each other (e.g., the least cosine similarity) and those training video episodes are chosen to be included in the hard-mined training episodes, as described herein.

At 510, a cross-attention module (e.g., an A3M module 124) is trained for action-appearance aligned classification using the generated set of hard-mined training episodes. In some examples, the hard-mined training episodes include multiple augmented training video segments for each original training episode and the training episode is treated as a class of each augmented training video segment. The augmented training video segments are encoded using the appearance encoder and/or the action encoder and provided to the cross-attention module. The cross-attention module combines the embeddings and analyzes them to learn to classify video segments as one of the original training episodes (e.g., as described above with respect to FIG. 4).

Figure 6:
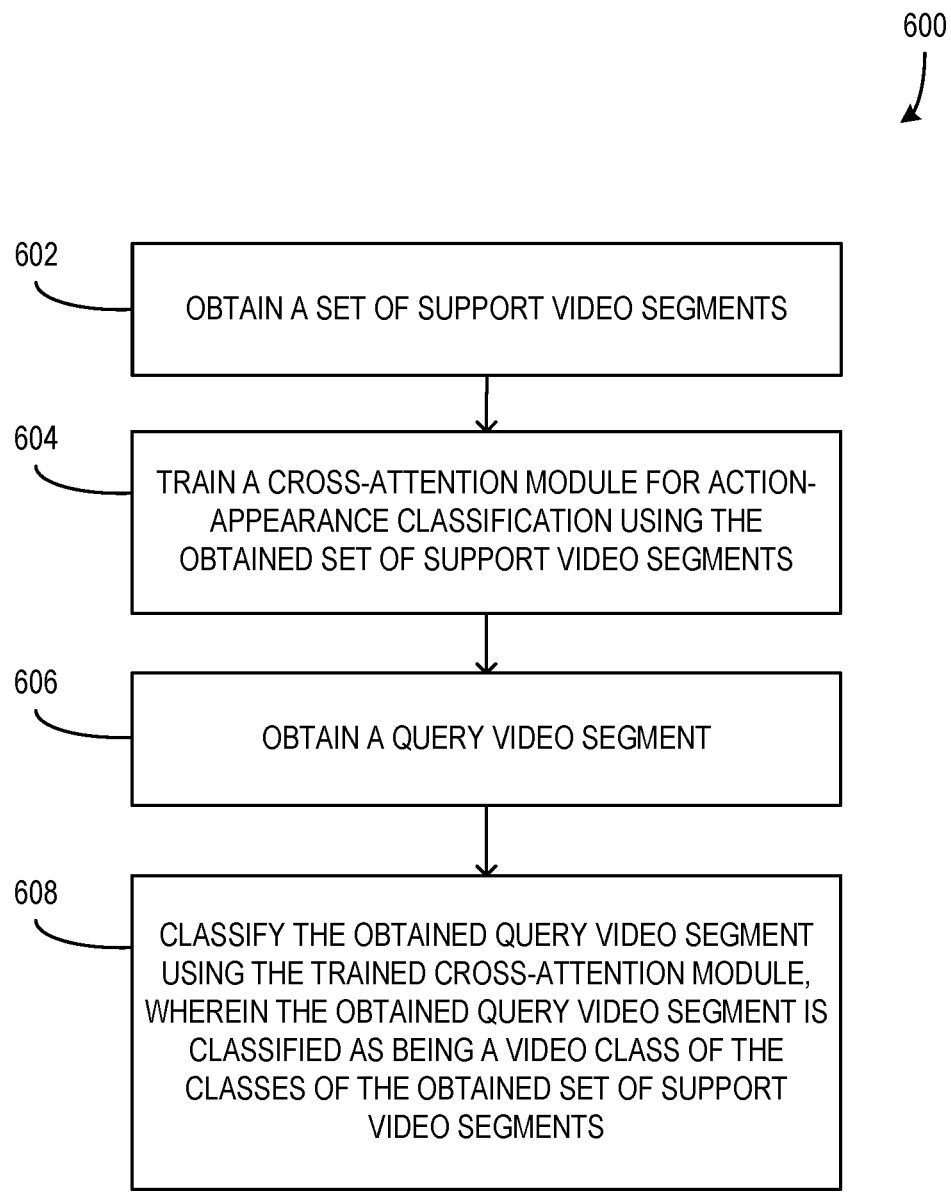
FIG. 6 is a flowchart illustrating a computerized method for fine-tuning a few-shot video recognition platform for novel video classes and classifying a query video episode using the fine-tuned few-shot video recognition platform.

FIG. 6 is a flowchart illustrating a computerized method 600 for fine-tuning a few-shot video recognition platform (e.g., the platform 102) for novel video classes (e.g., class labels 112, 114, and 116) and classifying a query video segment (e.g., query video 118) using the fine-tuned few-shot video recognition platform. In some examples, the method 600 is executed or otherwise performed on a system such as system 100 of FIG. 1. At 602, a set of support video segments is obtained. In some examples, each of the support video segments is associated with a class (e.g., the class labels 112, 114, and/or 116), such that the cross-attention module (e.g., the A3M module 124 and classifier 126) of the platform 102 can be fine-tuned to classify videos using those classes as described herein.

At 604, the cross-attention module is trained for action-appearance classification using the obtained set of support video segments. In some examples, the training of the cross-attention module includes generation of appearance embeddings and action embeddings using an appearance CNN and an action CNN (e.g., appearance CNN 120 and action CNN 122), respectively. The embeddings are used by the cross-attention module with the associated classes to fine-tune the cross-attention module to classify other videos using those classes. Because both appearance embeddings and action embeddings are used, the cross-attention module is trained to classify videos based on both appearance features (e.g., shapes in video frames) and action features (e.g., motion of objects across multiple frames).

At 606, a query video segment is obtained. In some examples, the query video segment includes video data that is similar to one or more of the support video episodes.

At 608, the obtained query video segment is classified using the trained cross-attention module as being part of a video class of the classes of the obtained set of support video segments. In some examples, classifying the obtained query video segment includes generating an appearance embedding and an action embedding of the query video segment. The generated appearance embedding and action embedding are then processed by the cross-attention module, which classifies the query video segment in a class based on appearance features and/or action features in the video segment.

Exemplary Operating Environment

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, fine-tuning a few-shot video recognition platform to classify videos in novel classes as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises: at least one processor: and at least one memory comprising computer program code, the at least one memory and the computer program code configured to, with the at least one processor, cause the at least one processor to: transform unlabeled training video data into a set of augmented training video segments: train an appearance encoder based on the set of augmented training video segments, wherein the appearance encoder is trained to encode video segments based on spatial semantics therein, wherein the appearance encoder is trained using unsupervised training: train an action encoder based on the set of augmented training video segments, wherein the action encoder is trained to encode video segments based on spatio-temporal semantics therein, wherein the action encoder is trained using unsupervised training: generate a set of hard-mined training episodes using the trained appearance encoder and the trained action encoder: and train a cross-attention module for action-appearance aligned classification using the generated set of hard-mined training episodes.

An exemplary computerized method comprises: obtaining, by a processor, a set of support video segments, wherein each support video segment is associated with a video class of a set of video classes: fine-tuning, by the processor, a trained cross-attention module for action-appearance aligned classification using the obtained set of support video segments and the associated video classes, wherein the trained cross-attention model is trained based on unlabeled training data using unsupervised training: obtaining, by the processor, a query video segment: and classifying, by the processor, the obtained query video segment using the trained cross-attention module, wherein the obtained query video segment is classified as being of a video class of the set of video classes.

One or more computer storage media having computer-executable instructions that, upon execution by a processor, cause the processor to at least: transform unlabeled training video data into a set of augmented training video segments: train an appearance encoder based on the set of augmented training video segments, wherein the appearance encoder is trained to encode video segments based on spatial semantics therein, wherein the appearance encoder is trained using unsupervised training: train an action encoder based on the set of augmented training video segments, wherein the action encoder is trained to encode video segments based on spatio-temporal semantics therein, wherein the action encoder is trained using unsupervised training: generate a set of hard-mined training episodes using the trained appearance encoder and the trained action encoder; and train a cross-attention module for action-appearance aligned classification using the generated set of hard-mined training episodes.

Alternatively, or in addition to the other examples described herein, examples include any combination of the following:

wherein the at least one memory and the computer program code is configured to, with the at least one processor, further cause the at least one processor to: obtain a set of support video segments, wherein each support video segment is associated with a video class of a set of video classes: fine-tune the cross-attention module for action-appearance aligned classification using the obtained set of support video segments and the associated video classes: obtain a query video segment: and classify the obtained query video segment using the fine-tuned cross-attention module, wherein the obtained query video segment is classified as being of a video class of the set of video classes.

wherein the set of video classes of the set of support video segments are novel classes that are different from classes of the training video data.

wherein the set of support video segments includes few-shot video segments, whereby the trained cross-attention module is fine-tuned based on the few-shot video segments to classify video segments based on video classes of the few-shot video segments.

wherein transforming training video data into a set of augmented training video segments includes at least one of the following: cropping sections of video data, horizontally flipping video data, changing colors of video data, transforming video data to grayscale, and introducing Gaussian blur into video data.

wherein training the appearance encoder based on the set of augmented training video segments includes training the appearance encoder based on sampled video frames that are evenly spaced throughout video episodes of the training video segments: and wherein training the action encoder based on the set of augmented training video segments includes training the action encoder based on sampled groups of consecutive video frames spaced throughout video episodes of the training video segments.

wherein training the cross-attention module for action-appearance aligned classification using the generated set of hard-mined training episodes includes: generating value linear mappings and key linear mappings from embeddings of the appearance encoder: generating query linear mappings from embeddings of the action encoder: combining the key linear mappings and the query linear mappings using dot-product to form attention scores, where in the attention scores provide correspondence that aligns action information with appearance information in the hard-mined training episodes: combining the attention scores and the value linear mappings to form combined embeddings: and training a classifier of the cross-attention module using the combined embeddings based on meta-learning techniques.

wherein the training video data includes labeled and unlabeled data, and the appearance encoder and action encoder are trained using at least one of the following: semi-supervised training and weakly-supervised training.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for transforming, by a processor, unlabeled training video data into a set of augmented training video segments: exemplary means for training, by the processor, an appearance encoder based on the set of augmented training video segments, wherein the appearance encoder is trained to encode video segments based on spatial semantics therein, wherein the appearance encoder is trained using unsupervised training: exemplary means for training, by the processor, an action encoder based on the set of augmented training video segments, wherein the action encoder is trained to encode video segments based on spatio-temporal semantics therein, wherein the action encoder is trained using unsupervised training; exemplary means for generating, by a processor, a set of hard-mined training episodes using the trained appearance encoder and the trained action encoder: and exemplary means for training, by a processor, a cross-attention module for action-appearance aligned classification using the generated set of hard-mined training episodes.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor; and
   at least one memory comprising computer program code, the at least one memory and the computer program code configured to, with the at least one processor, cause the at least one processor to:
   transform unlabeled training video data into a set of augmented training video segments;
   train an appearance encoder based on the set of augmented training video segments, wherein the appearance encoder is trained to encode video segments based on spatial semantics therein, wherein the appearance encoder is trained using unsupervised training;
   train an action encoder based on the set of augmented training video segments, wherein the action encoder is trained to encode video segments based on spatio-temporal semantics therein, wherein the action encoder is trained using unsupervised training;
   generate a set of hard-mined training episodes using the trained appearance encoder and the trained action encoder; and
   train a cross-attention module for action-appearance aligned classification using the generated set of hard-mined training episodes.

2. The system of claim 1, wherein the at least one memory and the computer program code is configured to, with the at least one processor, further cause the at least one processor to:
   obtain a set of support video segments, wherein each support video segment is associated with a video class of a set of video classes;
   fine-tune the cross-attention module for action-appearance aligned classification using the obtained set of support video segments and the associated video classes;
   obtain a query video segment; and
   classify the obtained query video segment using the fine-tuned cross-attention module, wherein the obtained query video segment is classified as being of a video class of the set of video classes.

3. The system of claim 2, wherein the set of video classes of the set of support video segments are novel classes that are different from classes of the training video data.

4. The system of claim 2, wherein the set of support video segments includes few-shot video segments, whereby the trained cross-attention module is fine-tuned based on the few-shot video segments to classify video segments based on video classes of the few-shot video segments.

5. The system of claim 1, wherein transforming training video data into a set of augmented training video segments includes at least one of the following: cropping sections of video data, horizontally flipping video data, changing colors of video data, transforming video data to grayscale, and introducing Gaussian blur into video data.

6. The system of claim 1, wherein training the appearance encoder based on the set of augmented training video segments includes training the appearance encoder based on sampled video frames that are evenly spaced throughout video episodes of the training video segments; and
wherein training the action encoder based on the set of augmented training video segments includes training the action encoder based on sampled groups of consecutive video frames spaced throughout video episodes of the training video segments.

7. The system of claim 1, wherein training the cross-attention module for action-appearance aligned classification using the generated set of hard-mined training episodes includes:
generating value linear mappings and key linear mappings from embeddings of the appearance encoder;
generating query linear mappings from embeddings of the action encoder;
combining the key linear mappings and the query linear mappings using dot-product to form attention scores, where in the attention scores provide correspondence that aligns action information with appearance information in the hard-mined training episodes;
combining the attention scores and the value linear mappings to form combined embeddings; and
training a classifier of the cross-attention module using the combined embeddings based on meta-learning techniques.

8. The system of claim 1, wherein the training video data includes labeled and unlabeled data, and the appearance encoder and action encoder are trained using at least one of the following: semi-supervised training and weakly-supervised training.

9. A computerized method comprising:
obtaining, by a processor, a set of support video segments, wherein each support video segment is associated with a video class of a set of video classes;
fine-tuning, by the processor, a trained cross-attention module for action-appearance aligned classification using the obtained set of support video segments, appearance embeddings and action embeddings, and the associated video classes, wherein the trained cross-attention model is trained based on unlabeled training data using unsupervised training;
obtaining, by the processor, a query video segment; and
classifying, by the processor, the obtained query video segment using the trained cross-attention module, wherein the obtained query video segment is classified as being of a video class of the set of video classes.

10. The computerized method of claim 9, wherein the set of video classes of the set of support video segments are novel classes that are different from classes of training video data used to train the cross-attention module.

11. The computerized method of claim 9, wherein the set of support video segments includes few-shot video segments, whereby the trained cross-attention module is fine-tuned based on the few-shot video segments to classify video segments based on video classes of the few-shot video segments.

12. The computerized method of claim 9, wherein the trained cross-attention model is trained based on training video segments that are augmented, wherein augmentations of the training video segments include at least one of the following: cropping sections of video data, horizontally flipping video data, changing colors of video data, transforming video data to grayscale, and introducing Gaussian blur into video data.

13. One or more computer storage media having computer-executable instructions that, upon execution by a processor, cause the processor to at least:
transform unlabeled training video data into a set of augmented training video segments;
train an appearance encoder based on the set of augmented training video segments, wherein the appearance encoder is trained to encode video segments based on spatial semantics therein, wherein the appearance encoder is trained using unsupervised training;
train an action encoder based on the set of augmented training video segments, wherein the action encoder is trained to encode video segments based on spatio-temporal semantics therein, wherein the action encoder is trained using unsupervised training;
generate a set of hard-mined training episodes using the trained appearance encoder and the trained action encoder; and
train a cross-attention module for action-appearance aligned classification using the generated set of hard-mined training episodes.

14. The one or more computer storage media of claim 13, wherein the computer-executable instructions, upon execution by a processor, further cause the processor to at least:
obtain a set of support video segments, wherein each support video segment is associated with a video class of a set of video classes, wherein the set of video classes are novel classes that are different from classes of the training video data;
fine-tune the cross-attention module for action-appearance aligned classification using the obtained set of support video segments and the associated video classes;
obtain a query video segment; and
classify the obtained query video segment using the fine-tuned cross-attention module, wherein the obtained query video segment is classified as being of a video class of the set of video classes.

15. The one or more computer storage media of claim 14, wherein the set of video classes of the set of support video segments are novel classes that are different from classes of the training video data.

16. The one or more computer storage media of claim 14, wherein the set of support video segments includes few-shot video segments, whereby the trained cross-attention module is fine-tuned based on the few-shot video segments to classify video segments based on video classes of the few-shot video segments.

17. The one or more computer storage media of claim 13, wherein transforming training video data into a set of augmented training video segments includes at least one of the following: cropping sections of the video data, horizontally flipping the video data, changing colors of the video data, transforming the video data to grayscale, and introducing Gaussian blur into the video data.

18. The one or more computer storage media of claim 13, wherein training the appearance encoder based on the set of augmented training video segments includes training the appearance encoder based on sampled video frames that are evenly spaced throughout video episodes of the training video segments; and wherein training the action encoder based on the set of augmented training video segments includes training the action encoder based on sampled groups of consecutive video frames spaced throughout video episodes of the training video segments.

19. The one or more computer storage media of claim 13, wherein training the cross-attention module for action-appearance aligned classification using the generated set of hard-mined training episodes includes:

generating value linear mappings and key linear mappings from embeddings of the appearance encoder;

generating query linear mappings from embeddings of the action encoder;

combining the key linear mappings and the query linear mappings using dot-product to form attention scores, where in the attention scores provide correspondence that aligns action information with appearance information in the hard-mined training episodes;

combining the attention scores and the value linear mappings to form combined embeddings; and training a classifier of the cross-attention module using the combined embeddings based on meta-learning techniques.

20. The one or more computer storage media of claim 13, wherein the training video data includes labeled and unlabeled data, and the appearance encoder and action encoder are trained using at least one of the following: semi-supervised training and weakly-supervised training.

* * * * *